(No Model.) 2 Sheets—Sheet 1.

L. D. HURD.
RUNNING GEAR FOR WAGONS.

No. 283,712. Patented Aug. 21, 1883.

WITNESSES:
Chas. Nida
C. Sedgwick

INVENTOR:
L. D. Hurd
BY Munn & Co
ATTORNEYS.

(No Model.)  2 Sheets—Sheet 2.

L. D. HURD.
RUNNING GEAR FOR WAGONS.

No. 283,712.  Patented Aug. 21, 1883.

WITNESSES:  INVENTOR:
Chas. Nida  L. D. Hurd
C. Sedgwick  BY Munn & Co.
 ATTORNEYS.

UNITED STATES PATENT OFFICE.

LORENZO D. HURD, OF CANDOR, ASSIGNOR OF ONE-THIRD TO JOSEPH C. SAMPSON, OF ELMIRA, NEW YORK.

RUNNING-GEAR FOR WAGONS.

SPECIFICATION forming part of Letters Patent No. 283,712, dated August 21, 1883.

Application filed March 20, 1883. (No model.)

*To all whom it may concern:*

Be it known that I, LORENZO D. HURD, of Candor, in the county of Tioga and State of New York, have invented a new and useful Improvement in Wagons, of which the following is a full, clear, and exact description.

Reference is to be had to the accompanying drawings, forming a part of this specification, in which similar letters of reference indicate corresponding parts in all the figures.

Figure 1:
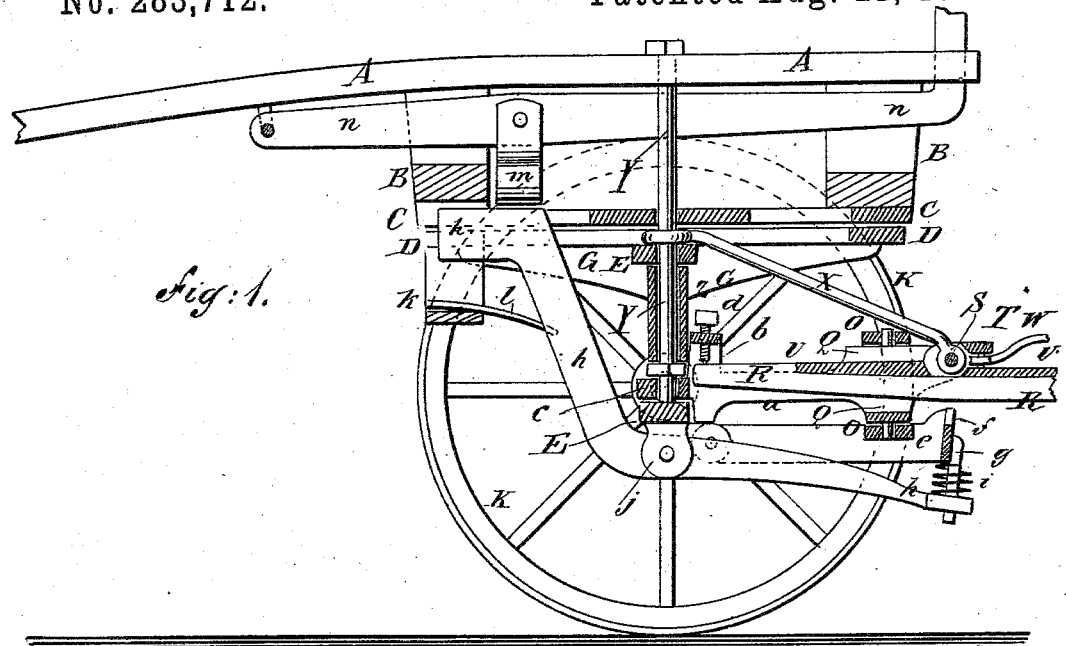
Figure 2:
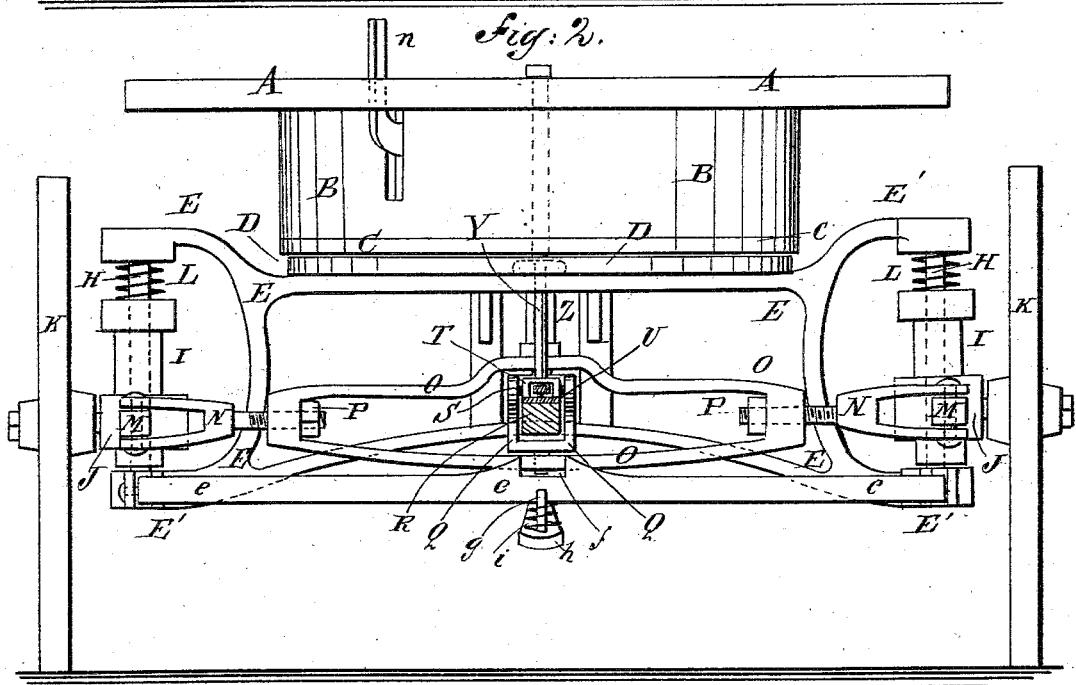
Figure 3:
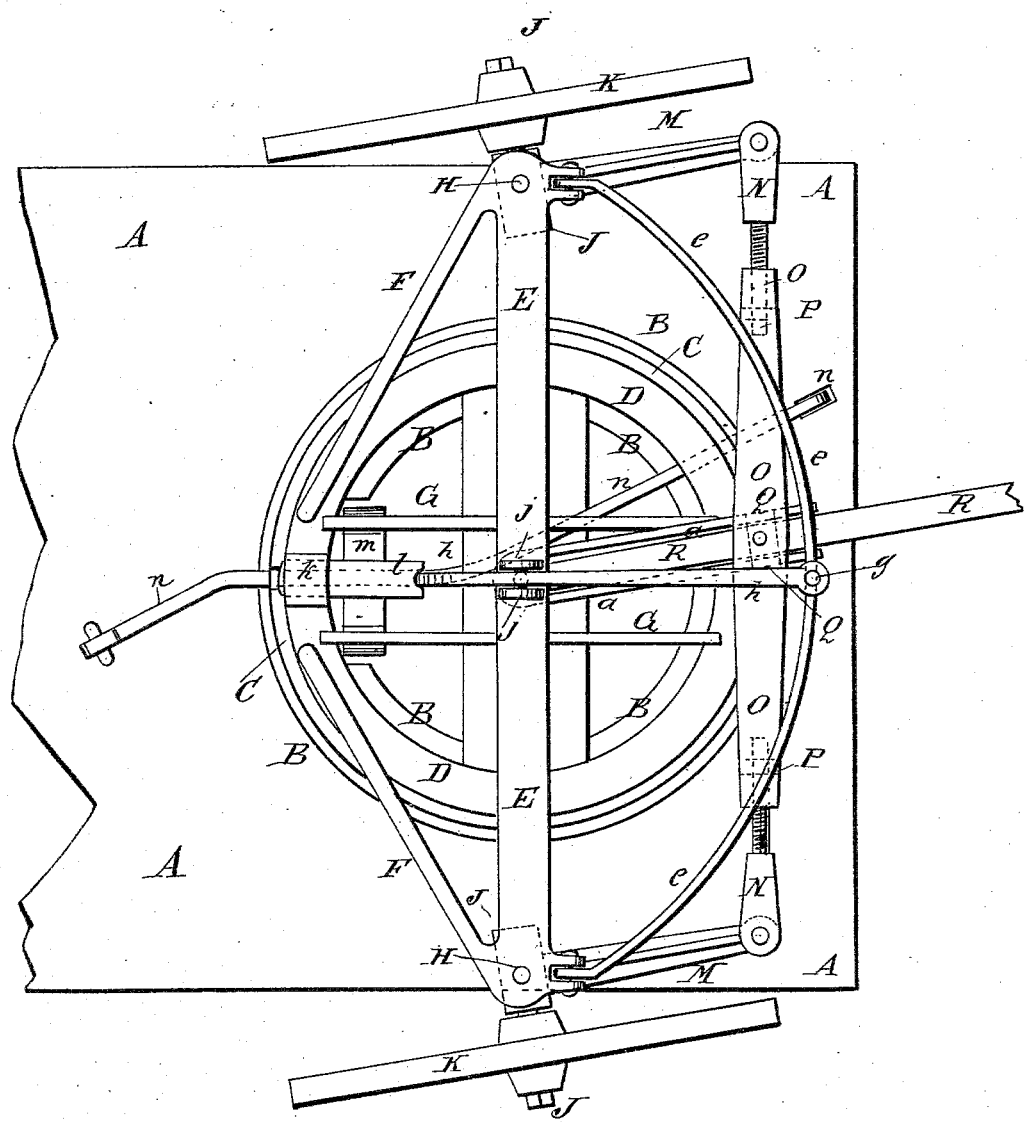
Figure 4:

Figure 1, Sheet 1, is a sectional side elevation of the forward part of a wagon to which my improvement has been applied. Fig. 2, Sheet 1, is a front elevation of the same, the tongue being shown in section. Fig. 3, Sheet 2, is an under side view of the same. Fig. 4, Sheet 2, is a plan view of the rear part of the tongue and its frame.

The object of this invention is to provide mechanisms for locking and releasing the axles and tongues of wagons, and also for regulating the gather of the forward wheels.

The invention consists in a wagon constructed with a slotted fifth-wheel and an axle locked by a spring-pressed lever, which is operated to release the said fifth-wheel and axle by a foot-lever provided with a cross-head foot. To the axle is hinged a curved bar, which is notched to receive the tongue, is held up by a spring, and is raised to engage with the tongue and rigidly connect the tongue with the axle by the locking-lever, when operated to release the fifth-wheel and axle. The tongue is connected with the axle and king-bolt by keepers connected by bars having a perforated plate at their rear end, so that the draft will be in a direct line with the whiffletrees. The tongue-plate is made with a solid projection, which is recessed to receive the hammer-strap and brace-rod. The frame hinged to the tongue is coupled with the ends of arms formed upon the axle-arms by bolts and nuts to allow the gather of the forward wheels to be readily regulated, as will be hereinafter fully described.

A represents the bottom of the wagon-body, with which is connected, by suitable supports, B, the stationary part C of the fifth-wheel. The upper part, C', of the fifth-wheel rests upon the movable part D, which is attached to the axle E, and is strengthened in position by the inclined braces F, attached to it and to the lower corners of the said axle, and by cross-bars G, attached to it and to the said axle. The axle E is made in the form of a frame, and has arms E' upon the upper and lower corners of its ends, to which are attached the ends of vertical rods or bolts H.

Upon the rods H are placed sockets I, formed upon the inner parts of the arms J, upon the journals of which the forward wheels, K, revolve. The sockets I are made shorter than the spaces between the arms E', and between the upper ends of the said sockets and the upper arms E' are placed spiral or other springs, L, which sustain the load in the forward part of the wagon-body.

Upon the forward sides of the axle-arms J are formed forwardly-projecting arms M, to the outer ends of which are hinged the slotted outer ends of the connecting-bolts N. The inner parts of the bolts N pass through holes in in the ends of the swinging frame O, and have screw-threads formed upon them to receive the nuts P, which are placed between the outer parts of the top and bottom bars of the said frame O, and are thus held from turning. With this construction, by disconnecting the outer ends of the bolts N the said bolts can be turned into or out of the nuts P, so as, when again attached to the arms N, to bring the said arms closer together or farther apart, and thus regulate the gather of the wheels K. The top and bottom bars of the frame O are pivoted at their centers to the upper and lower ends of the keeper Q, through which the tongue R passes.

Upon the upper parts of the forward edges of the side bars of the keeper Q are formed lugs, which are perforated to receive the bolt S, which passes through a projection, T, formed upon the strap U, attached to the upper side of the tongue R, to hinge the said tongue to the said keeper.

In the forward side of the projection T is formed a recess, in which is secured, by a bolt or rivet, V, the rear end of the hammer-strap W.

In a slot in the upper side of the projection T is inserted the end of a brace-rod, X, which is secured in place by the bolt S. The rear end of the brace X has an eye formed in it to receive the king-bolt Y, which passes down through the bottom A of the wagon-body, the fifth-wheel C D, and the axle E, and has a tubular washer, Z, placed upon it between the top and bottom bars of the axle E.

Upon the side bars of the keeper Q are formed bars $a$, which extend back along the opposite sides of the tongue R, and upon them are formed, at the rear end of the said tongue, a keeper, $b$, to serve as a guard and guide to the said rear end of the tongue as it moves up and down.

The rear ends of the bars $a$ are connected by a plate, $c$, formed upon them, and which is placed between the lower end of the tubular washer Z and the lower bar of the axle E, and is perforated for the passage of the king-bolt Y.

In the top of the keeper $b$ is formed a screw-hole to receive a set-screw, $d$, which can be turned down to rest against the upper side of the rear end of the tongue R, and support the forward end of the said tongue above the ground. When it is desired to have a drop-tongue, the set-screw $d$ is turned up.

To lugs formed upon or attached to the forward side of the ends of the lower arms E' are hinged the ends of a curved bar, $e$, which passes beneath the tongue R at the forward side of the keeper Q, and has a notch or recess, $f$, in the center of its upper edge, so that when the bar $e$ is engaged with the tongue R the lateral movements of the said tongue will turn the axle E upon the king-bolt Y.

To the center of the curved bar $e$ is attached a pin, $g$, which projects downward through a hole in the forward end of the lever $h$, and has a spiral spring, $i$, placed upon it between the said bar $e$ and the said lever $h$, as shown in Fig. 1. The middle part of the lever $h$ is fulcrumed to lugs $j$, formed upon or attached to the lower side of the center of the axle E. The rear part of the lever $h$ inclines upward and rearward, and its rear end projects to the rearward horizontally, so as to pass through a slot in the lower part, D, of the fifth-wheel and enter a slot in the upper part, C, of the said fifth-wheel, and hold the lower part of the fifth-wheel and the axle E from turning. The rear end of the lever $h$ works in a keeper, $k$, attached to the lower side of the lower part, D, of the fifth-wheel upon the opposite sides of its slot. The rear end of the lever $h$ is held up by a spring, $l$, the rear end of which is attached to the keeper $k$, and its forward end presses against the lower side of the rear part of the said lever $h$.

Upon the upper edge of the rear end of the lever $h$ rests a cross-head foot, $m$, which is hinged to a lever, $n$, and has its ends rounded, so that the said lever $h$ can pass beneath it readily. The rear end of the lever $n$ is fulcrumed to the lower side of the wagon-bottom A, and its forward part is bent upward at right angles and passes up through a hole in the forward end of the bottom A, as shown in Figs. 1, 2, and 3, so that the driver can readily reach and operate the said lever with his foot. With this construction, when the forward end of the lever $n$ is forced downward it forces the rear end of the lever $h$ out of the slot in the upper part, C, of the fifth-wheel, and forces the forward end of the said lever $h$ upward, raising the bar $e$, so that its recess $f$ will engage with the tongue R, when the said tongue comes into line with the length of the wagon, so that the lateral movement of the tongue R will turn the lower part, D, of the fifth-wheel and the axle E. When the lever $n$ is released, the spring $l$ forces up the rear end of the lever $h$ against the lower side of the upper part, C, of the fifth-wheel and causes the said lever to enter the slot in the said part C, when the tongue R comes into line with the end of the wagon, and locks the fifth-wheel and axle from turning. As the rear end of the lever $h$ moves upward its forward end moves downward, allowing the bar $e$ to drop away from the tongue R and release it, so that the lateral movement of the tongue will turn the axle-arms J upon the bolts H, and thus guide the wagon.

Having thus fully described my invention, I claim as new and desire to secure by Letters Patent—

1. In a wagon, the combination, with the slotted fifth-wheel C D and the axle E, of the spring-pressed lever $h$, the cross-head foot $m$ and the foot-lever $n$, substantially as herein shown and described, whereby the fifth-wheel and axle are locked from turning, and can be readily released, as set forth.

2. In a wagon, the combination, with the axle E, the tongue R, and the locking-lever $h$, of the hinged bail $e$ and the spring $i$, substantially as herein shown and described, whereby the said tongue will be rigidly connected with the axle when the said axle is unlocked, as set forth.

3. In a wagon, the combination, with the tongue R, the axle E, and the king-bolt Y, of the keepers Q $b$, the connecting-bars $a$, and the perforated plate $c$, substantially as herein shown and described, whereby the draft will be in a direct line with the whiffletrees, as set forth.

4. In a wagon, the tongue-plate U, having solid projection T, recessed to receive the hammer-strap W, and the brace-rod X, substantially as herein shown and described.

LORENZO D. HURD.

Witnesses:
JAMES H. JENNINGS,
JUDSON K. ALLEN.